United States Patent [19]

Higginson

[11] 3,841,652

[45] Oct. 15, 1974

[54] TANDEM AXLE SUSPENSION ASSEMBLY

[76] Inventor: Roy C. Higginson, Poplar Bldg., Crystal Springs Apts. No. 204, Atglen, Pa. 19365

[22] Filed: Mar. 10, 1972

[21] Appl. No.: 233,487

[52] U.S. Cl. ............................ 280/104.5 B, 267/54
[51] Int. Cl. ............................................ B60g 5/06
[58] Field of Search .......... 280/104.5 B; 267/54, 56

[56] References Cited
UNITED STATES PATENTS

| | | | |
|---|---|---|---|
| 2,469,158 | 5/1949 | Frees | 267/56 |
| 3,117,799 | 1/1964 | Behnke | 280/104.5 B |
| 3,195,916 | 7/1965 | Cain | 280/104.5 B |
| 3,361,442 | 1/1968 | Willetts | 280/104.5 B |
| 3,591,197 | 7/1971 | Haley | 280/104.5 B |

*Primary Examiner*—Philip Goodman
*Attorney, Agent, or Firm*—Clarence A. O'Brien; Harvey B. Jacobson

[57] ABSTRACT

A tandem axle, spring suspension assembly having a pair of leaf springs each arranged for mounting an axle, and a pair of spring hangers mountable on a vehicle frame and arranged for receiving ends of the leaf springs. An equalizer assembly is arranged between the spring hangers for receiving the opposite spring ends. The spring hangers each have a cavity for receiving a spring end, and at least the front spring hanger is provided with an insert forming a spring bearing surface for protecting the hanger walls from wear. When the front hanger is provided with such an insert, a symmetrical spring bearing surface is provided for maintaining a predetermined effective length of a spring mounted in the hanger. The spring effective length and the suspension mounting height are selectable as a function of the arrangement of the insert. The front hanger side walls have torque arm attachment portions extending away from the insert extending portions, and provided with bosses for increasing the bearing surface of a torque arm bolt for resisting wear due to fore-and-aft motion of a torque arm during operation, and especially on braking. The equalizer assembly has an equalizer beam receiving the spring ends and provided with a transverse hole in which a hollow pin is arranged. The pin has flat surfaces provided on portions which extend beyond the beam, and an equalizer bracket to which the equalizer beam is removably connected has projections which are arranged to retainingly engage the flat surfaces and prevent movement of the pin about an axis parallel to the transverse hole and pin. A resilient member is arranged in the transverse hole and surrounding the pin for permitting the beam to articulate about the pin.

16 Claims, 17 Drawing Figures

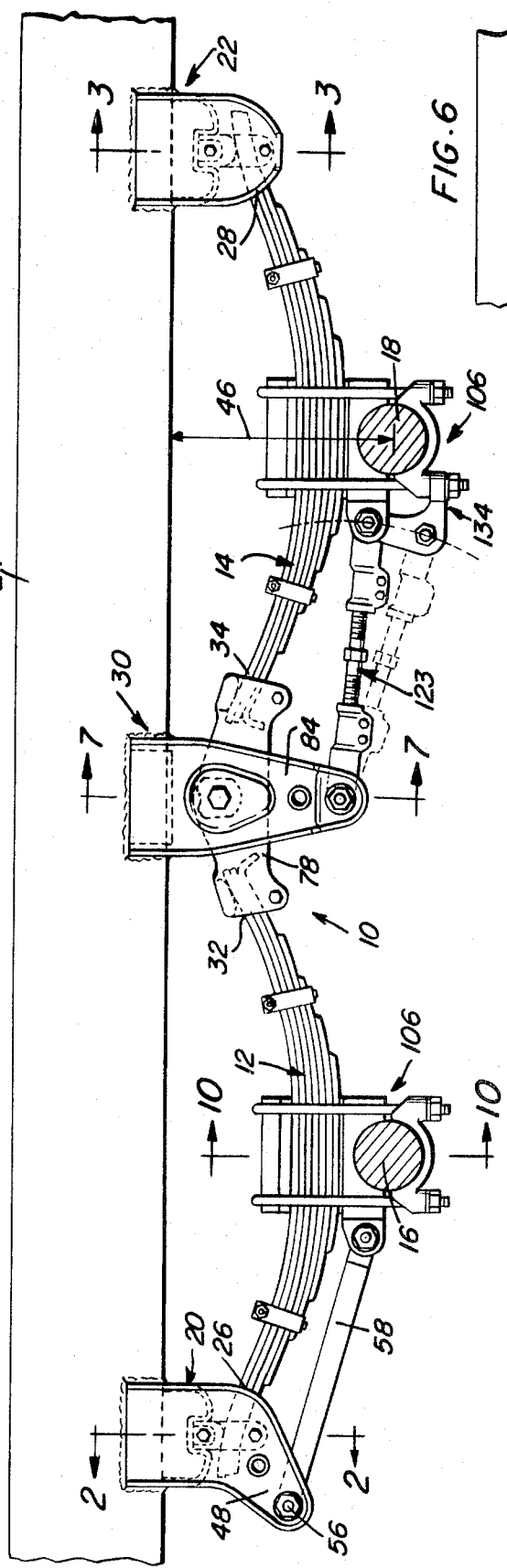

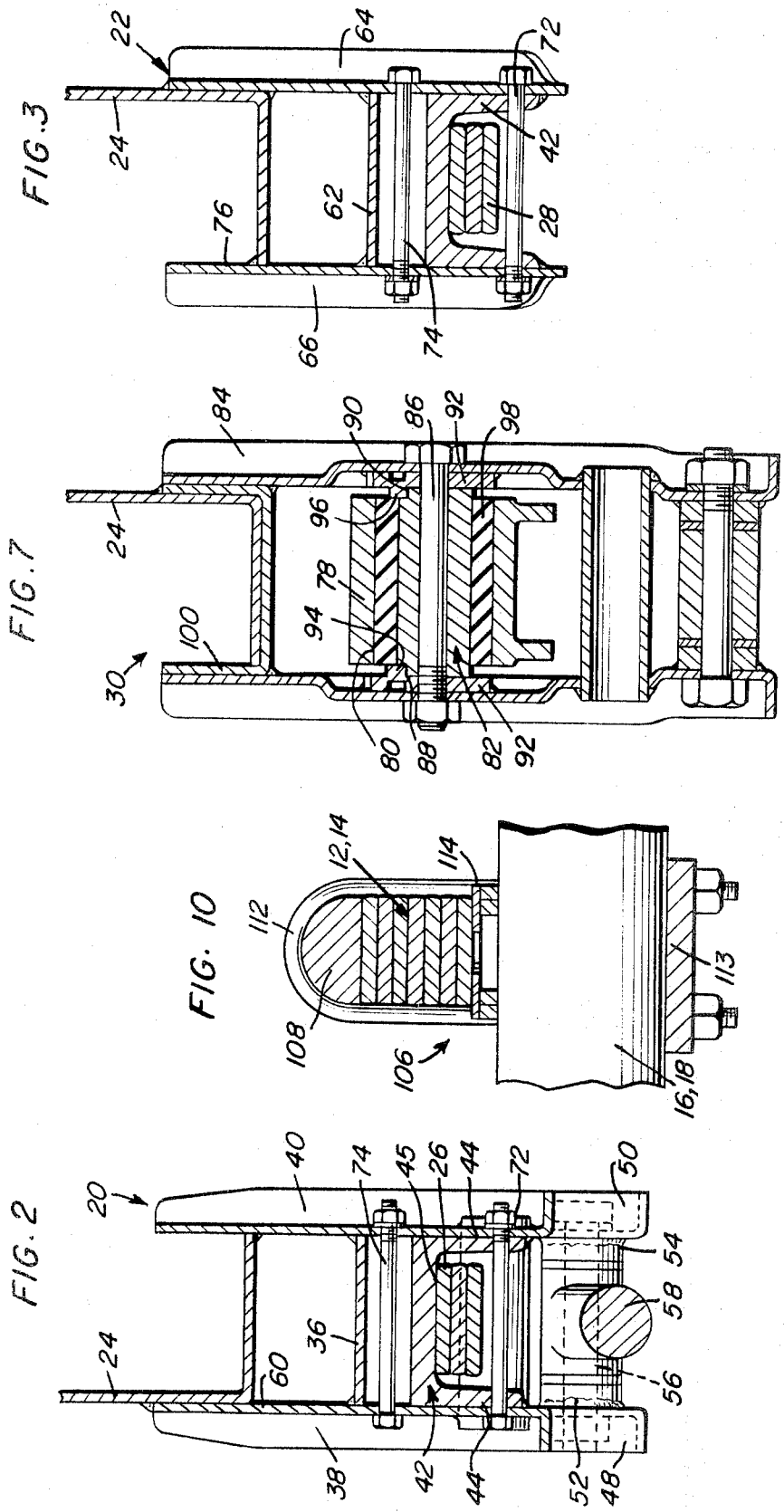

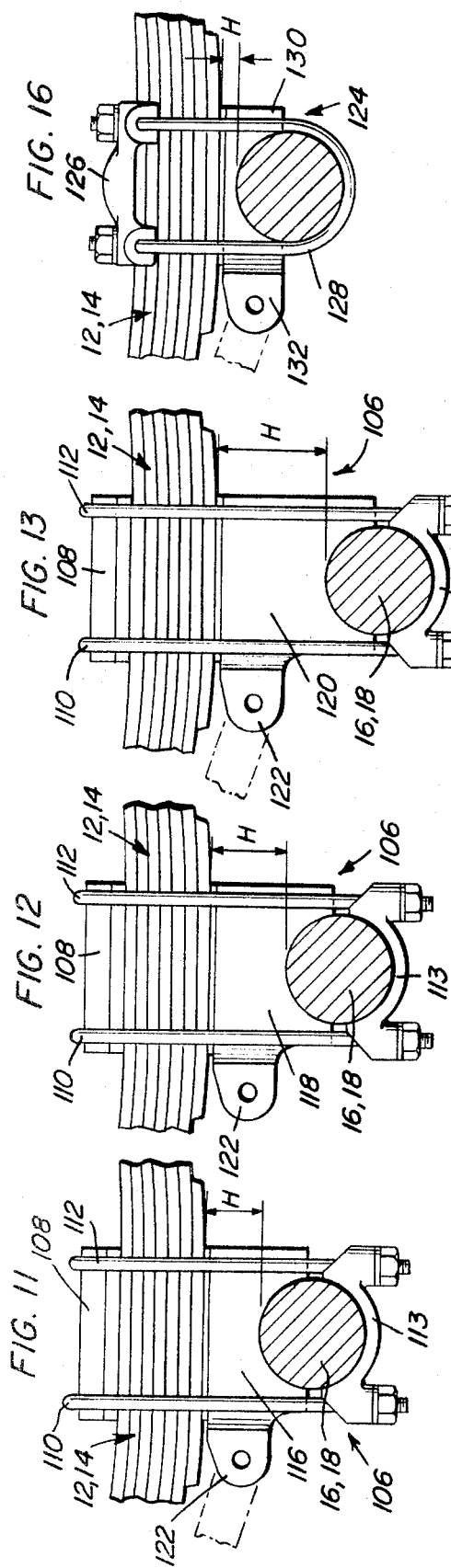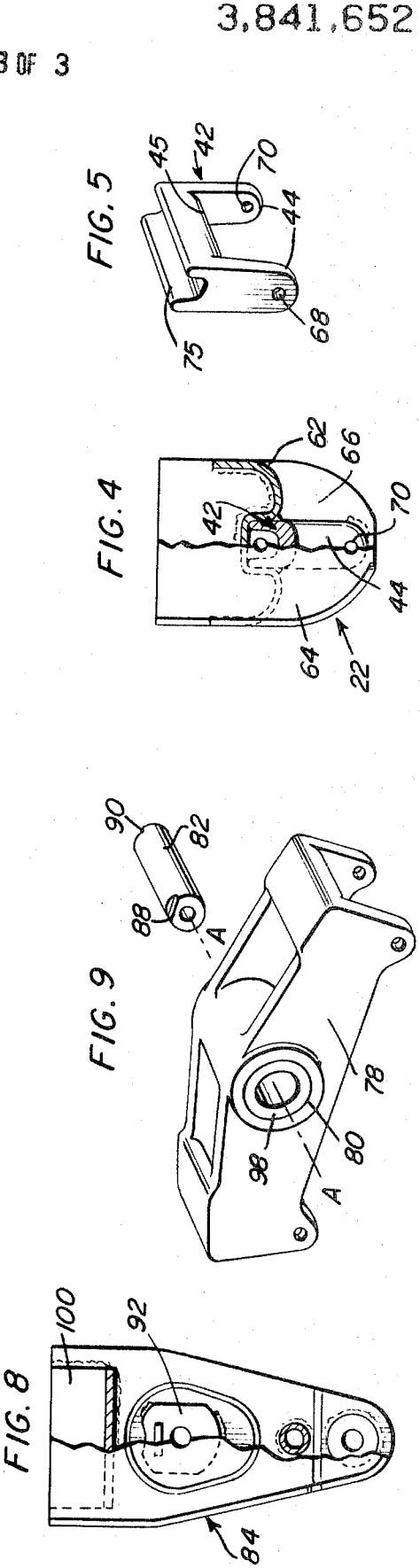

3,841,652

TANDEM AXLE SUSPENSION ASSEMBLY

BACKGROUND OF THE INVENTION

1. Field of the Invention

This invention relates to a tandem axle, spring suspension assembly for vehicles such as semi-trailers. In particular, this invention relates to such a suspension assembly using semielliptical leaf springs in which the effective spring length may be selected for optimum ride, and in which an improved equalizer provides more effective transmission of forces between axles.

2. Description of the Prior Art

Tandem axle suspensions are known which utilize tandem springs, one pair in each side of the vehicle, with their adjacent ends interconnected by an equalizer. This construction provides a smooth ride, and the equalization provides a desired proportioning of the load between the axles irrespective of irregularities of a road surface and the like over which the vehicle is travelling.

SUMMARY OF THE INVENTION

It is an object of the present invention to provide a tandem axle, spring suspension assembly which features improved ride and equalization of load, and will further realize reduced maintenance cost and longer life.

It is another object of the present invention to provide improved spring hangers and equalizer assembly for use in vehicle suspensions.

These and other objects are achieved according to the present invention by providing a spring suspension assembly for tandem axles which has a pair of leaf springs, each arranged for mounting an axle, a pair of improved spring hangers mountable upon a vehicle frame and arranged for receiving ends of the leaf springs, and improved equalizer means arranged between the spring hangers for receiving ends of the springs opposite those ends received by the hangers for supporting a vehicle load exerted through the springs and transmitting force applied to wheels of one axle to the wheels of the other axle.

In a preferred embodiment of the present invention, the spring hangers each have a cavity defined by an end wall and side walls for receiving a spring end, and at least one of the hangers is provided with an insert forming a spring bearing surface for protecting the hanger walls from wear. This insert has portions which extend away from the spring hanger end wall and are arranged for protecting the side walls from wear.

The pair of spring hangers are arranged as front and rear spring hangers, as is conventional. If desired, the hangers may be used with a single axle unit without an equalizer assembly. The insert, if only one is used, is associated with the front spring hanger, and arranged for providing a symmetrical spring bearing surface for maintaining a predetermined effective length of a spring mounted in the hanger. The spring effective length and the suspension mounting height, or the distance between an axle centerline and an underside of a vehicle frame, are selectable as a function of the arrangement of the insert.

The side walls of the front spring hanger preferably have torque arm attachment portions which extend away from the insert extending portions. These portions are provided with means for increasing the bearing surface of a torque arm bolt for resisting wear due to fore-and-aft motion of a torque arm during operation and especially on braking, and for permitting the use of torque arm bolts of various diameters as employed in existing suspension units.

The equalizer means may have an equalizer beam receiving the spring ends and provided with a transverse hole or bore. A hollow pin is arranged in this transverse bore, and means are provided for engaging the pin and preventing movement thereof about an axis parallel to the transverse bore and the pin. The equalizer beam is arranged for being removably connected to an equalizer bracket as by a bolt passing through the hollow pin. This equalizer bracket has a means mounted thereon for engaging with at least one flat surface provided on a portion of the hollow pin extending beyond the beam for retaining the hollow pin when the beam and bracket are connected together. The flat surface and the retainingly engaging means form the means for engaging the pin and preventing movement thereof. A resilient member may be arranged in the transverse bore surrounding the hollow pin for permitting the beam to articulate about the pin.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view showing a tandem axle, spring suspension assembly according to the present invention mounted on a vehicle frame.

FIG. 2 is a fragmentary sectional view taken generally along the line 2—2 of FIG. 1.

FIG. 3 is a fragmentary sectional view taken generally along the line 3—3 of FIG. 1.

FIG. 4 is a side elevational view, partly cut away and in section, of a rear spring hanger for a spring suspension assembly according to the present invention.

FIG. 5 is a perspective view showing a spring hanger insert according to the present invention.

FIG. 6 is a fragmentary, side elevational view showing a modified rear spring hanger according to the present invention.

FIG. 7 is a fragmentary, sectional view taken generally along the line 7—7 of FIG. 1.

FIG. 8 is a side elevational view, partly cut away and in section, showing an equalizer bracket according to the present invention.

FIG. 9 is an exploded, perspective view showing an equalizer beam and pin according to the present invention.

FIG. 10 is a fragmentary, sectional view taken generally along the line 10—10 of FIG. 1.

FIGS. 11 to 13 are fragmentary, sectional views showing various clamping assemblies for use with a spring suspension assembly according to the present invention.

FIG. 14 is a side elevational view showing a spring seat according to the present invention.

FIG. 15 is a top plan view, partly cut away and in section, showing the spring seat of FIG. 14.

FIG. 16 is a fragmentary, sectional view showing a modified clamping assembly for use with a spring suspension assembly according to the present invention.

FIG. 17 is a perspective view showing an anti-hop device for use with a spring suspension assembly according to the present invention.

DESCRIPTION OF THE PREFERRED EMBODIMENTS

FIG. 1 of the drawings shows a tandem axle, spring suspension assembly 10 according to the present invention. This assembly 10 has a pair of leaf springs 12, 14 arranged in tandem, and each mounting an axle 16, 18. A pair of spring hangers 20, 22 are mounted in a known manner on a portion of a vehicle frame 24, and are arranged for receiving ends 26, 28 of leaf springs 12, 14. An equalizer assembly 30 is arranged between spring hangers 20, 22 for receiving ends 32, 34 of leaf springs 12, 14 for supporting a vehicle load exerted through the springs 12, 14 and transmitting force applied to wheels (not shown) of one axle 16, 18 to the wheels (not shown) of the other axle 18, 16. Leaf springs 12, 14 are semielliptical leaf springs as are conventional in tandem axle, spring suspension assemblies.

Referring now to FIG. 2 of the drawings in addition to FIG. 1, front spring hanger 20 has an end wall 36 and side walls 38, 40 which define a cavity for receiving a spring end 26. An insert 42 is provided for hanger 20 for forming a spring bearing surface for protecting walls 36, 38, and 40 from wear. Insert 42 has portions 44 which extend away from end wall 36 and are arranged for protecting side walls 38 from wear. An arcuate surface 45 forms the bearing surface for the spring ends.

When associated with front spring hanger 20, insert 42 provides a symmetrical spring bearing surface for maintaining a predetermined effective length of a spring 12 mounted in hanger 20. The effective spring length and the suspension mounting height 46 (FIG. 1), which is the distance between an axle centerline and an underside of a vehicle frame 24, are selectable as a function of the arrangement of insert 42. Effective spring lengths longer than with known arrangements are attainable. Further, the ride qualities of suspension system 10 can be adjusted to give optimum trailer ride for a particular load. Insert 42 may be a cast cam insert which may be welded or bolted and the like into desired position in hanger 20. Welding easily permits placement of insert 42 for a desired effective spring length.

Side walls 38, 40 have torque arm attachment portions 48, 50 which extend away from the insert extending portions 44, and are provided with bosses 52, 54 for increasing the bearing surface of a torque arm bolt 56 for resisting wear due to fore-and-aft motion of a torque arm 58. This motion is present during operation, and especially on braking. Further, this arrangement permits the use of torque arm bolts 56 of various diameters as are employed in existing suspension units, thus facilitating interchangeability with suspension units currently being manufactured. Moreover, it permits the drilling of an oversized hole for enabling a, for example, hardened steel liner (not shown) to be inserted through side walls 38, 40 and through the bushing of torque arm 58. This hardened steel liner will provide even further protection from wear.

Hanger 20 is provided with a recess 60 for enabling same to be mounted on frame 24 in a known manner. Any suitable, known connecting means may be employed, such as welding and screw fasteners (not shown).

FIGS. 3 to 5 of the drawings show details of a rear spring hanger 22 according to the present invention. Rear spring hanger 22 has an end wall 62 and side walls 64, 66 which define a cavity for receiving a spring end 28. Hanger 22 may also be provided with an insert 42. Portions 44 of insert 42 are provided with openings 68, 70 for permitting a bolt 72 to pass therethrough. This bolt 72 as well as a bolt 74 pass through side walls 64, 66 to hold together the various elements of hanger 22. Bolts 72 and 74 may also be employed with hanger 20, and perform a similar function. Insert 42 may be additionally or alternatively fastened to hanger 22 as by, for example, welding. The attachment of insert 42 to hangers 20 and 22 is done in substantially the same manner.

As can best be seen from FIG. 5 of the drawings, arcuate surface 45 of insert 42 forms the bearing surface thereof. Since insert 42 is preferably constructed from a, for example, hard steel, it provides a long life bearing surface. Opposite surface 45 is a somewhat arcuate recess 75. This portion of insert 42 fits up into a recess formed in end walls 36, 62, and recess 75 permits the passage of bolt 74.

It is to be understood that hangers 20, 22 can be attached to a frame 24 other than by cavity forming portions thereof being attached to frame 24. Alternatively, a hanger 76 could be welded in a known manner directly to the bottom surface of frame 24 as shown in FIG. 6.

The details of an equalizer assembly 30 according to the present invention are shown in FIGS. 7 to 9 of the drawings. Equalizer assembly 30 has an equalizer beam 78 arranged for receiving spring ends 32, 34, and provided with a transverse hole or bore 80. A hollow pin 82 is arranged in bore 80. An equalizer bracket 84 may be mounted on frame 24 in a manner like that of hangers 20, 22, and 76. Equalizer bracket 84 and equalizer beam 78 may be removably connected together by means of a, for example, bolt 86 passed through openings provided in the side walls of bracket 84 and through pin 82. Pin 82 is provided with a pair of flat surfaces 88 and 90 on a portion thereof which extends beyond beam 78. Bearing pads 92 provided with projections 94, 96 are mounted on bracket 84, and are arranged for projections 94, 96 retainingly engaging flat surfaces 88, 90 when beam 78 and bracket 84 are connected together for preventing movement of pin 82 about an axis A—A which passes through bore 80 and is parallel thereto and to pin 82. A resilient bushing, which may be constructed in a known manner from a suitable, known rubber material, is arranged in bore 80 surrounding pin 82 for permitting beam 78 to articulate about pin 82.

A channel 100 which is arranged in opposition to pads 92 defines a cavity for attaching equalizer bracket 84 to frame 24. Alternatively, channel 100 may be eliminated, and the equalizer bracket attached to the underside of frame 24 in the manner of hanger 76. Bearing pads 92 function in a like manner to bosses 52 of hanger 20.

Equalizer assembly 30 may be assembled by first inserting bushing 98 into bore 80. Bushing 98 fits symmetrically within bore 80 with a compression fit. Pin 82 may then be inserted into bushing 98. Pin 82 also is positioned symmetrically, and the flat surfaces 88, 90 are arranged toward frame 24 in parallel to the horizontal centerline (not shown) of beam 78. This subassembly is then positioned within equalizer bracket 84 such that flat surfaces 88 and 90 engage projections 94, 96 of pads 92. Bolt 86 may then be inserted through the side walls of bracket 84 and through pin 82, and tightened down to hold pin 82 securely in position. The engagement between projections 94, 96 and surfaces 88, 90 will prevent rotation of pin 82. All movement in equalizer assembly 30 is absorbed, and takes place within resilient bushing 98. Equalizer assembly 30 may be easily disassembled by merely removing bolt 86 and removing the subassembly including equalizer beam 78, pin 82, and bushing 98. Thus removed, replacement of any or all parts that may require service may be easily carried out.

Clamping assemblies 106 for use with a spring suspension system 10 according to the present invention will now be discussed with reference to FIGS. 1, and 10 to 15 of the drawings. Each clamping assembly 106 has a saddle 108 clamped to a spring 12, 14 by U-bolts 110, 112 which are adjustably fastened to a seat 113. A plurality of spring seats 114, 116, 118, and 119 are shown which have different heights (H). Although all of the axles 16, 18 shown in the drawings are circular in cross section, it is to be understood that the arcuate recess 120 (FIG. 14) and seat 113 may instead by configured to take axles (not shown) having a, for example, rectangular or square cross section. The different height (H) of the various spring seats permits different size, or diameter axles to be used without changing the torque arm length. Projections 122 are provided in all the spring seats for connecting a torque arm 123 thereto. As can be seen from the drawings, projections 122 always have the same relationship with respect to springs 12, 14. Thus, a suspension assembly 10 according to the present invention retains the same geometry regardless of which spring seat is used.

FIG. 16 of the drawings shows a modified clamping assembly 124 according to the present invention which has a saddle 126 to which are threadedly connected U-bolts 128. Only one bolt 128 is shown in FIG. 16. A spring seat 130 provided with projections 132 (only one of which is shown in FIG. 16) for attachment thereto of a torque arm completes assembly 124. Assembly 124 functions in a like manner to assemblies 106, and may also have different height (H) spring seats.

Referring now to FIGS. 1 and 17 of the drawings, an optional anti-hop bracket 134 is shown which may be attached to the clamping assemblies 106, as is shown in FIG. 1 of the drawings. This bracket 134 has a flange 136 which is clamped to seat 113 of the assembly 106 as by the retaining nuts of U-bolt 110. Extended portions 138, 140 of bracket 134 may then selectively be connected to torque arm 123 in either the projections 122 position, full lines in FIG. 1, or in a position as shown by the broken lines in FIG. 1.

The purpose of anti-hop bracket 134, which may be installed as original equipment or as a conversion, is to provide additional control of the axles 12, 14 as required. By providing a torque arm attachment point at an axle 12, 14 which is below the centerline of that axle, bracket 134 increases the torque arm angle. Both of these factors are considered to give "hop" control.

Although torque arm 58 is shown as a non-adjustable type of arm, an adjustable arm such as 123 may be substituted therefor if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A spring suspension assembly for tandem axles, comprising, in combination:
   a. a pair of leaf springs, each arranged for mounting an axle;
   b. a pair of spring hangers mountable on a vehicle frame and arranged for receiving ends of said leaf spring; and
   c. equalizer means arranged between said spring hangers for receiving ends of said springs opposite those ends received by said hangers for supporting a vehicle load exerted through the springs and transmitting force applied to one axle to the other axle, said equalizer means including an equalizer beam receiving the spring ends and provided with a transverse hole, a pin arranged in said transverse hole, and means for engaging said pin and preventing movement of said pin about an axis parallel to said transverse hole and said pin, said equalizer means further including an equalizer bracket mountable on a vehicle frame, and means for removably connecting said beam to said bracket, and wherein said means for preventing includes at least one flat surface provided on a portion of said pin which extends beyond said beam, and a means mounted on said bracket for retainingly engaging said flat surface when said beam and bracket are connected together.

2. A structure as defined in claim 1, wherein said equalizer means further includes a resilient member arranged in said transverse hole and surrounding said pin for permitting said beam to articulate about said pin.

3. A structure as defined in claim 1, wherein said spring hangers each have a cavity defined by an end wall and side walls for receiving a spring end, and at least one of said hangers is provided with an insert forming a spring bearing surface for protecting the hanger walls from wear.

4. A structure as defined in claim 3, wherein said insert has portions which extend away from the spring hanger end wall and arranged for protecting said side walls from wear.

5. A structure as defined in claim 4, wherein said spring hangers are a front and rear spring hanger, the insert being associated with the front spring hanger and arranged for providing a symmetrical spring bearing surface for maintaining a predetermined effective length of a spring mounted in the hanger, the spring effective length and the distance between an axle centerline and underside of a vehicle frame being selectable as a function of the arrangement of said insert.

6. A structure as defined in claim 5, wherein said walls have torque arm attachment portions which extend away from the insert extending portions, and are provided with means for increasing the bearing surface of a torque arm bolt for resisting wear due to fore-andaft motion of a torque arm during operation and especially on braking, and for permitting the use of torque arm bolts of various diameters as employed in existing suspension units.

7. A structure as defined in claim 6, wherein said equalizer means further includes a resilient member arranged in said transverse hole and surrounding said pin for permitting said beam to articulate about said pin.

8. A structure as defined in claim 6, wherein said transverse hole passes through said beam, said pin is hollow, and the removably connecting means is a bolt passing through said pin and openings provided in said bracket.

9. A structure as defined in claim 7, wherein said transverse hole passes through said beam, said pin is hollow, and the removably connecting means is a bolt passing through said pin and openings provided in said bracket.

10. A structure as defined in claim 1, wherein said equalizer means further includes a resilient member arranged in said transverse hole and surrounding said pin for permitting said beam to articulate about said pin.

11. A structure as defined in claim 10, wherein said transverse hole passes through said beam, said pin is hollow, and the removably connecting means is a bolt passing through said pin and openings provided in said bracket.

12. A structure as defined in claim 1, wherein said transverse hole passes through said beam, said pin is hollow, and the removably connecting means is a bolt passing through said pin and openings provided in said bracket.

13. A spring suspension assembly for tandem axles, comprising, in combination:
  a. a pair of leaf springs, each arranged for mounting an axle;
  b. a pair of spring hangers mountable on a vehicle frame and arranged for receiving ends of said leaf spring, said spring hangers each having a cavity defined by an end wall and side walls for receiving a spring end, and at least one of said hangers being provided with an insert affixed thereto and forming a spring bearing surface for protecting the hanger walls from wear, said spring hangers being a front and rear spring hanger, and the insert being associated with the front spring hanger and arranged for providing a symmetrical spring bearing surface for maintaining a predetermined effective length of a spring mounted in the hanger, the spring effective length and the distance between an axle centerline and underside of a vehicle frame being selectable as a function of the arrangement of said insert, said walls having torque arm attachment portions which extend away from the insert extending portions, and being provided with means for increasing the bearing surface of a torque arm bolt for resisting wear due to fore-and-aft motion of a torque arm during operation and especially on braking, and for permitting the use of torque arm bolts of various diameters as employed in existing suspension units; and
  c. equalizer means arranged between said spring hangers for receiving ends of said springs opposite those ends received by said hangers for supporting a vehicle load exerted through the springs and transmitting force applied to one axle to the other axle.

14. A structure as defined in claim 3, wherein said equalizer means further includes a resilient member arranged in said transverse hole and surrounding said pin for permitting said beam to articulate about said pin.

15. A structure as defined in claim 3, wherein said walls have torque arm attachment portions which extend away from the insert extending portions, and are provided with means for increasing the bearing surface of a torque arm bolt for resisting wear due to fore-and-aft motion of a torque arm during operation and especially on braking, and for permitting the use of torque arm bolts of various diameters as employed in existing suspension units.

16. A spring suspension assembly for tandem axles, comprising, in combination:
  a. a pair of leaf springs, each arranged for mounting an axle;
  b. a pair of spring hangers mountable on a vehicle frame and arranged for receiving ends of said leaf spring, said spring hangers each having a cavity defined by an end wall and side walls for receiving a spring end, and at least one of said hangers being provided with an insert affixed thereto and forming a spring bearing surface for protecting the hanger walls from wear, said spring hangers being a front and rear spring hanger, and the insert being associated with the front spring hanger and arranged for providing a symmetrical spring bearing surface for maintaining a predetermined effective length of a spring mounted in the hanger, the spring effective length and the distance between an axle centerline and underside of a vehicle frame being selectable as a function of the arrangement of said insert, the insert including an arcuate surface arranged adjacent the hanger end wall and forming a bearing surface for spring ends, and portions arranged extending away from the arcuate surface and the end wall for protecting the hanger side walls from wear, an arcuate recess being provided in the insert between the arcuate surface and hanger end wall; and
  c. equalizer means arranged between said spring hangers for receiving ends of said springs opposite those ends received by said hangers for supporting a vehicle load exerted through the springs and transmitting force applied to one axle to the other axle.

* * * * *